C. E. MORRIS.
PROPELLING MECHANISM FOR TRACTORS.
APPLICATION FILED APR. 11, 1912.
1,107,825.
Patented Aug. 18, 1914.
2 SHEETS—SHEET 1.
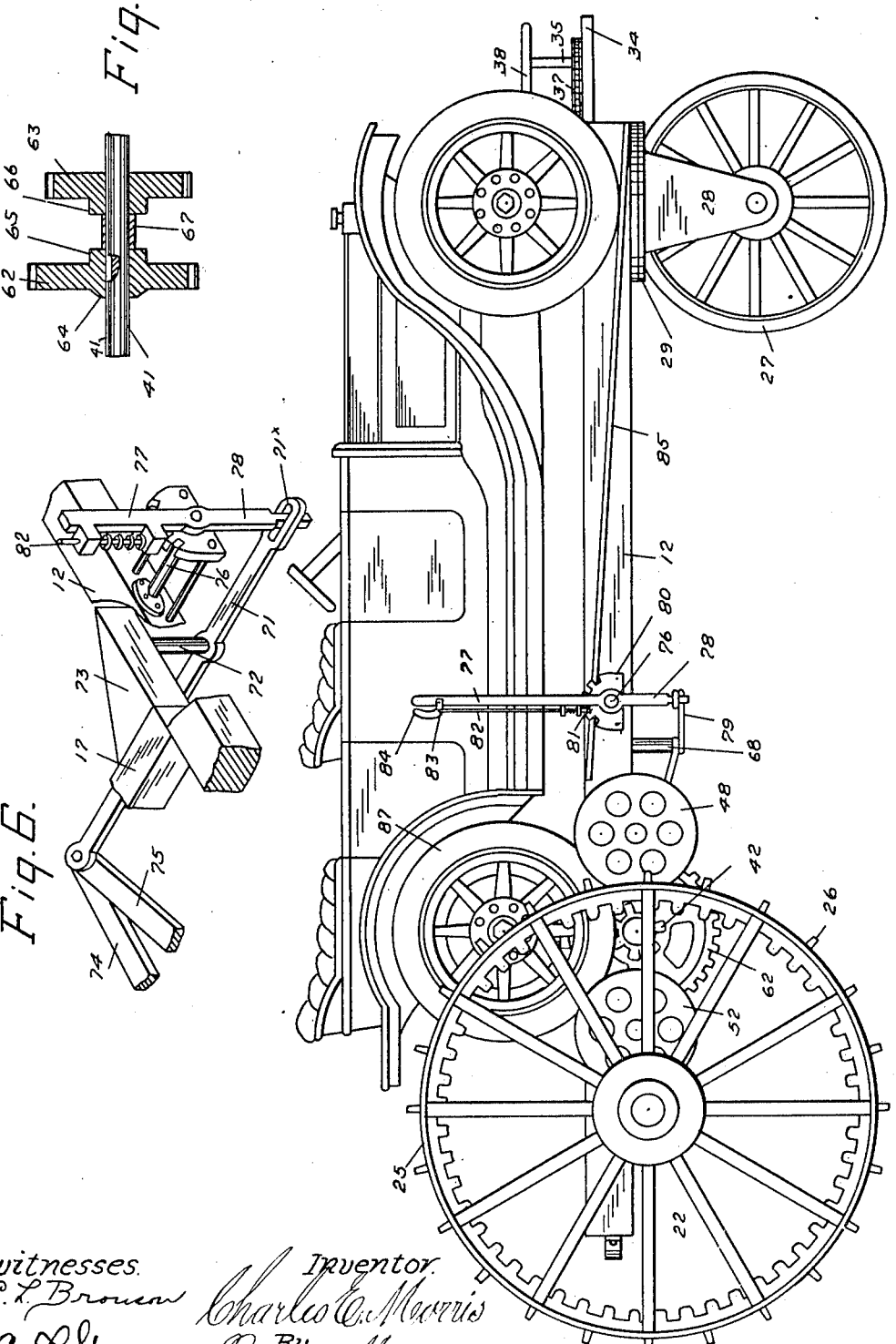
Fig. 5.
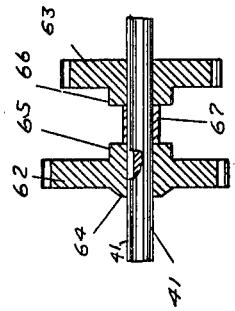
Fig. 6.
Fig. 1.
Witnesses.
C. L. Brown
A. L. Greer.
Inventor.
Charles E. Morris
By Richt & Manning Attorney.

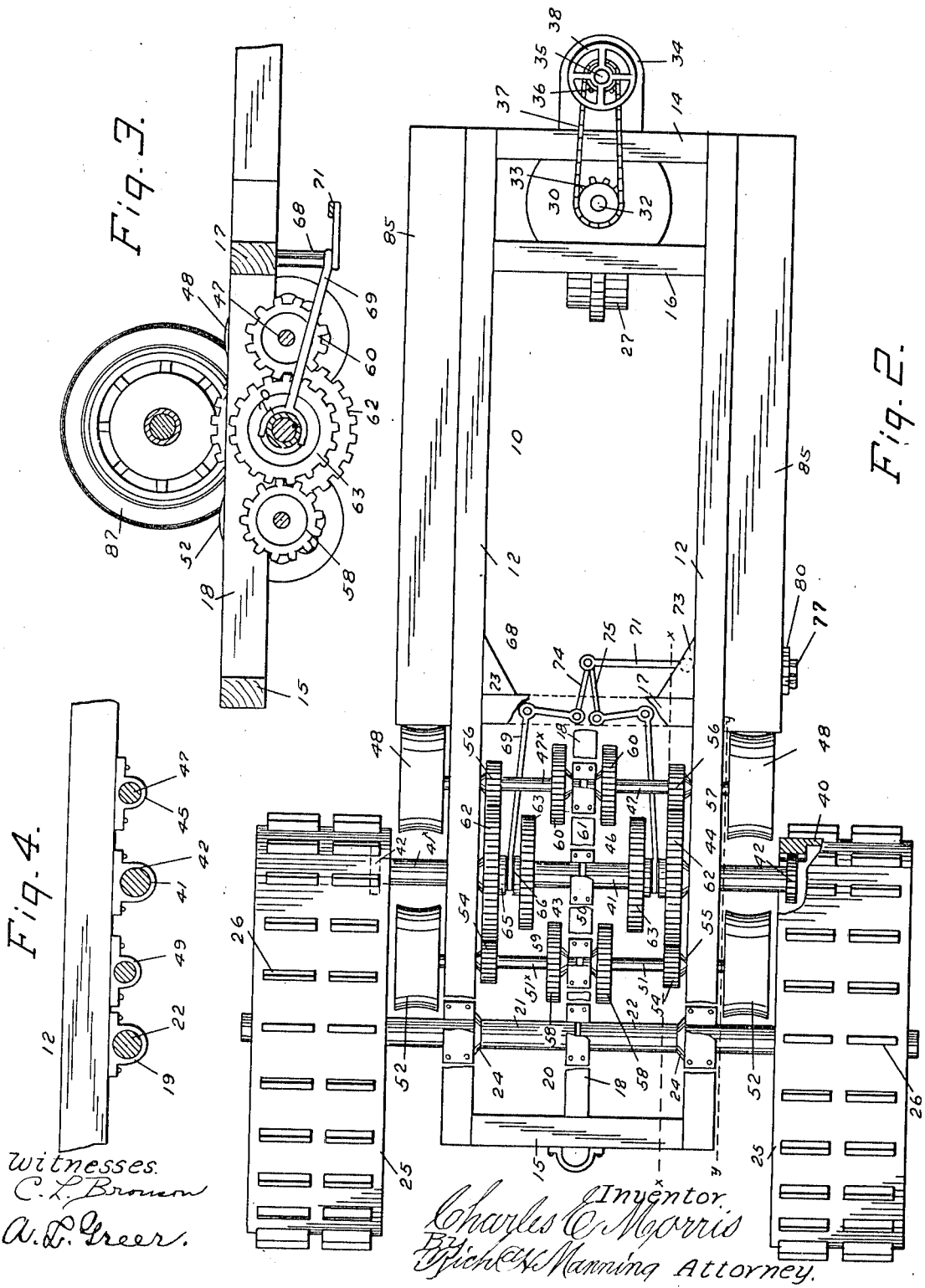

UNITED STATES PATENT OFFICE.

CHARLES E. MORRIS, OF LANE, KANSAS.

PROPELLING MECHANISM FOR TRACTORS.

1,107,825.  Specification of Letters Patent.  Patented Aug. 18, 1914.

Application filed April 11, 1912. Serial No. 689,966.

*To all whom it may concern:*

Be it known that I, CHARLES E. MORRIS, a citizen of the United States of America, residing at Lane, in the county of Franklin and State of Kansas, have invented certain new and useful Improvements in Propelling Mechanism for Tractors; and I do hereby declare that the following is a full, clear, and exact description of the invention, such as will enable others to make and use the same, reference being had to the accompanying drawings, forming a part of this specification.

The objects of the invention are: First: the utilization of the high speed of a motor, or a motor operated vehicle in a reduction to the moderate degrees of speed in propulsion required in a tractor. Second: to afford means for transmitting to a tractor different degrees of speed from the motor. Third: to conserve the power of a motor vehicle employed upon a tractor. Fourth: the utilization of different speeds of divided motor shafts of an automobile, for independent power transmission. Fifth: the transmission of the power of the automobile directly to the wheels of a tractor.

The invention consists in the novel combination and arrangement of parts, such as will be first fully described, and then specifically pointed out in the claims.

In the drawings: Figure 1. is a side view of a tractor embodying the invention. Fig. 2. is a plan view of the tractor, and of the power-transmitting mechanism. Fig. 3. is a longitudinal, vertical, sectional view, taken on the line *x*, *x*, on the tractor on Fig. 1. Fig. 4. is a longitudinal, vertical, sectional view, taken on line *y*, *y*, on the tractor in Fig. 1, showing also one of the rear wheels of the automobile. Fig. 5. is a detail view of a longitudinal portion of one of the main power-transmitting shafts to the traction wheels, showing the sliding, speed-changing gear wheels, in vertical section. Fig. 6. is a detail view, in perspective, of a portion of the frame of the tractor, showing the pivoted levers actuating the bell crank levers to the speed-changing gear wheels.

Similar numerals of reference indicate corresponding parts in all the figures of the drawings.

The body or frame 10, of the tractor, as seen in the drawings to which reference is made, is rectangular in form, and consists of the longitudinal side beams 12, and the transverse beams 14 and 15, connected at their ends with the respective forward and rear ends of the beams 12. The length of the frame 10 for the use intended, is of increased length to that of a four-wheeled motor vehicle, known as an automobile, the motive power of which it is designed specially to conserve, and the width consequently of frame 10 is approximate that of the chassis of an automobile. A short distance in rear of the forward end beam 14, of frame 10, is a transverse beam 16, connected rigidly at its ends with the side beams 12, and intermediate said beams 16 and the rear end beam 15 is a transverse beam 17, connected rigidly at its ends with the side beams 12. A longitudinally extended beam 18 is connected at its forward end with the beam 17, and its rear end with the beam 15 at points on said beams 17 and 15 equi-distant from the side beams 12.

Upon the under side of beams 12 and 18, at points a short distance forward of the line of the rear end beam 15, are secured the journal boxes 19 and 20, as seen in Figs. 2 and 4, in which are mounted the alined rear frame-supporting rotary shafts, constituting the rear axles of the tractor, these alined shafts having collars 24. rigidly secured to the said alined shafts, close in position to the inner surfaces of the journal boxes 19. The outer ends of these alined shafts 21, 22, forming the axles, extend the proper distance outwardly from the lines of the outer surfaces of the side beams 12, for the purpose further described, and upon said ends are secured rigidly the broad traction wheels 25, respectively, the outer surface of the periphery of each wheel having the inclined lugs 26, for obtaining purchase upon the ground. The forward end of frame 10, is supported upon the caster wheel 27. This wheel is carried between the side brackets 28, which are connected with the lower surface of a horizontal wheel or disk 29. This wheel or disk 29 is in frictional contact with an upper disk or wheel 30, secured rigidly to the lower surfaces of beams 14 and 16. With the lower wheel or disk 29 is connected centrally a pivot 32, which extends upwardly through the center of the upper wheel or disk 29, a short distance, and upon said post is a sprocket wheel 33.

Connected rigidly with the forward surface of the forward end beam 14, of frame 10, is a horizontally extended support 34, upon which is mounted in a vertical position a rotative shaft 35, upon which shaft is a sprocket wheel 36, around which wheel is extended an endless sprocket chain 37, which chain also extends around the sprocket wheel 33, on the pivot post 32, for the caster wheel 27. Upon the upper end of the pivot post is a hand wheel 38, which serves to guide the tractor when the latter is in motion.

Upon the inner portions of the inner surfaces of the peripheries of the wheels 25, of the tractor, are gear teeth 40.

41, 41× indicate alined, power-transmitting, rotary shafts, extending transversely from the lines of the gear teeth 40, upon the outer ends of which alined shafts 41, 41×, are cog wheels 42, which mesh with the teeth 40, on the inner portion of the periphery of the wheels 25. The said alined shafts 41, 41×, are journaled in the journal boxes 42 and 43, on the lower surfaces of the side beams 12 and 18, respectively. Upon the alined shafts 41, 41×, close in position to the inner surfaces of journal boxes 42, are collars 44, rigidly secured thereto, and which prevent the said alined shafts from lateral sliding movements in the journal boxes.

Journaled in the journal boxes 45 and 46, which are secured to the lower surfaces of the respective side beams 12 and intermediate beam 18, at points the requisite distance forward of the alined shafts 41, 41×, are the alined rotary shafts 47, 47×, the outer end portions of which shafts extend past the lines of the outer surfaces of the side beams 12, and upon said ends are the grooved wheels 48. Upon the lower surfaces of the side beams 12 and intermediate beam 18, in rear of the journal boxes 42 and 43, for the alined shafts 41, 41×, and at a distance from said journal boxes as the distance between the journal boxes 42 and 43 and 45 and 46, are secured the journal boxes 49 and 50, in which is supported in a parallel position with the shaft 41, the alined rotary shafts 51, 51×, which shafts are the same length as shafts 47, 47×. Upon the outer end portions of shaft 51, 51×, are the grooved wheels 52, which are the same in size as the grooved wheels 48, on shafts 51, 51×, and directly in rear thereof.

Upon the alined shafts 51, 51×, adjacent to the inner surfaces of the journal box 49, are secured the small spur car or cog wheels 54, each of which cog wheels are provided with hubs 55, which hubs extend in the direction of and are adapted to contact with the inner surfaces of the journal boxes 49, on beams 12. Upon the alined rotary shaft 41, 41×, are secured the cog wheels 56, which are of the same size as cog wheels 54, and are provided with hubs 57, which also are adapted to come into contact with the inner surfaces of the journal boxes 45. Upon the alined rotary shafts 41, 41×, are secured the gear wheels 58, which are larger in circumference than the wheels 54, these wheels 58 having hubs 59, which are adapted to come into contact with the respective opposite surfaces of the journal box 50, on the beam 18.

Upon the alined rotary shafts 47, 47×, are gear wheels 60, which are of the same circumference as the gear wheels 58, and are provided with hubs 61, which are directly opposite, and are adapted to come into contact with the respective opposite surfaces of the journal box 46, on beam 18. The speed-changing mechanism embraces the aforesaid cog wheels 54, 56, 58 and 60, and the sliding gear wheels 62 and 63, as seen in Figs. 2 and 5. These gear wheels are mounted on the transverse power-transmitting shafts 41, 41×, and secured thereto by the splines 64, so as to rotate in unison with shafts 41, 41×, and slide freely in the longitudinal direction thereof. Upon the inner side of wheel 62 is a hub 65, and upon the side of the wheel 63, opposite the wheel 62 is a hub 66. The gear wheels 62 are large in circumference, and are mounted on the alined rotary shafts 41, 41×, and are adapted to mesh with the respective cog wheels 54 and 56, on the respective alined rotary shafts 41, 41×, and 51, 51×. The gear wheel 63 is smaller in circumference than the gear wheel 62, and is adapted to mesh with the respective gear wheels 58 and 60, on the alined, independent rotary shafts 51, 51×, and 47, 47×. As shown, the gear wheels 62 and 63 are arranged a short distance apart, and said shaft 41 between the hubs 65 and 66, of the respective wheels 62 and 63, is splined a sleeve 67, which is rigidly connected at its respective ends with the outer ends of the hubs 65 and 66, forming a neck slightly smaller in circumference than said hubs.

Secured rigidly at their upper ends to the lower surfaces of the transverse beam 17, at points equi-distant from the respective side beams 12, and the forward, connecting end portion of beam 18, are pivot posts 68, the lower ends of which posts extend downwardly below a line horizontally extended through the shafts 47, 47×. With the lower end portions of the pivot posts 68 are pivotally connected the bell crank levers 69, one arm of each of which levers is longer than the other arm, and are forked at 70, and said forked ends extended to and in engagement with the collars 67, connecting the wheels 62 and 63.

71 indicates an operating lever, pivoted intermediate its ends to the lower end portion of a pivot post 72, which is rigidly connected at its upper end portion to the lower surface of the triangular corner brace 73, to the transverse beam 17, on the right-hand side of frame 10. The outer end of said lever 71 is slotted at 71×, and extends outwardly a short distance past a vertical line upon the outer surface of the beam 12, on the right-hand side of frame 10. With the inner end of the lever 71 is pivotally connected the outer ends of the separate links 74 and 75, the free ends of which links are pivotally connected with the outer end portions of the short arms of the respective bell crank levers 69.

Upon the right-hand side of frame 10, and secured to the outer surface of side beams 12, at a point in a vertical line with the outer end portion of the lever 71, is a long pivot post 76, to the outer end portion of which is pivoted the operating lever 77, a portion 78 of which lever is reduced in width and extends downwardly within the wide slot 71$^x$, in the outer end portion of the lever 71. Upon the pivot post 76 is a notched segment plate 80, and upon the operating lever 77 is a detent 81, operated by a rod 82, which is pivoted at 83, to a hand lever 84, which is also pivoted to the upper end portion of the lever 77. Upon the outer surfaces of beams 12 are secured the track plates 85, which plates are narrow in width, and extend horizontally and outwardly from said surfaces a short distance and from the line of the lower surface and forward ends of beams 12, rearwardly in a gradual, upwardly-inclined plane, to a point forward of the grooved wheels 48.

86 indicates a motor car or automobile, shown mounted on the tractor, the forward wheels of which are supported on the forward ends of track plate 85, and the rear power-driven wheels 87, the tires of which wheels are mounted on the peripheries of the grooved wheels 48 and 52, these wheels receiving the power through the differential gear common to an automobile.

It is well known that the development of the power of the engines is best obtained in automobiles at high speed, and in changing to low speed the loss of power is obviously a resultant from the gear. In the transmission of this high speed of the motor of the automobile, which is herein utilized for a tractor, the speed is gradually reduced in the operation of the levers 77. The large gear wheels 62, when in mesh with the cog wheels 55 and 56, as seen in Fig. 1, are in position to impart to shafts 41, 41$^x$, full power of the engine, at a low or moderate speed. Prior to the starting of the engine of the automobile, the lever 77 is thrown forward, moving the sliding gear wheels 62 simultaneously on shafts 41, 41$^x$, out of mesh with the spur gear 54 and 56, and the gear wheels 66 into mesh with the respective gear wheels 58 and 60. Motion being imparted to the shafts 41, 41$^x$, the tractor is moved to the place of work under speed, and when the tractive power is required for work, the lever 77 is reversed in position and the power utilized by moving into engagement of the wheels 62 with the spur gear 55 and 56, obtaining thereby a reduced speed.

The power from the shafts 41, 41$^x$ is transmitted directly to the traction wheels 25, through the gear wheels 42, and with the independency of the wheels through the medium of the alined shafts, the operation of turning the tractor from a straight course, or in a short circuit, is more advantageously obtained than hitherto. The essentials of my invention are, that the automobile may be utilized upon the farm for not only a means of conveyance, but in connection with the actual farm work for cultivating the land, and also for road improvements, and wherever traction becomes necessary.

It is obvious that the transmission of power instead of that generated by the motor of an automobile may be that employed by other well-known tractors, the employment of the automobile, however, affords all the advantages of differential speed imparted to the rear wheels, and this form of motive power is preferably employed, beside the general use of a motor vehicle at times when such use is invaluable.

It is also obvious that the speed-changing mechanism may be subjected to gradations in the proportions of gear wheels as may be desired, and in its application made to the wheels upon ordinary axle beams, with such modifications as are within the scope of the appended claims.

Having fully described my invention, what I now claim as new and desire to secure by Letters Patent is:

1. In power transmitting mechanism the combination with alined power transmitting rotary shafts, of duplex speed changing sliding gear wheels varying in size and splined on the respective alined shafts, connecting devices connecting the said duplex gear wheels with each other, and speed changing gear wheels with which the sliding gear wheels on the alined power transmitting shafts are adapted to mesh and bell crank levers co-acting with the said duplex sliding gear wheels to move said wheels on the respective alined power transmitting shafts simultaneously, and a single lever operably connected with the said bell crank levers.

2. In a mechanism for transmitting power to tractors, alined power transmitting rotary shafts and duplex speed changing sliding gear wheels on the respective shafts varying in size and splined on said shafts, collars connecting the duplex sliding gear wheels on the respective alined shafts with each other, and speed changing gear wheels with which the said duplex gear wheels on the alined power transmitting shafts are adapted to mesh, and bell crank levers for controlling the movements of the combined duplex sliding gear wheels having forked connections therewith, and a single lever operably connected with said bell crank levers.

3. In duplex speed changing and propelling mechanism main alined power transmitting rotary shafts and duplex speed changing sliding gear wheels splined on the respective shafts, connecting devices connecting said duplex gear wheels on the respective alined shafts with each other, auxiliary alined shafts parallel with said main alined power transmitting shafts and arranged in position forwardly and rearwardly respectively of said alined power transmitting shafts, gear wheels on said auxiliary alined shafts varying in size, with which the said combined duplex sliding gear wheels are adapted to mesh, bell crank levers having forked portions connected with the collars on the combined duplex sliding gear wheels, links pivotally connected with the said bell crank levers and an operating lever with which the free ends of said links are pivotally connected.

CHARLES E. MORRIS.

Witnesses:
GEORGE W. PEASE,
FRANK T. McGINNIS.